United States Patent
Lota

(10) Patent No.: US 7,422,260 B2
(45) Date of Patent: Sep. 9, 2008

(54) CENTER CONSOLE HAVING A STOWABLE MAP POCKET COVER

(75) Inventor: Charan Singh Lota, Canton, MI (US)

(73) Assignee: Toyota Motor Engineering & Manufacuting North America, Inc., Erlanger, KY (US)

(*) Notice: Subject to any disclaimer, the term of this patent is extended or adjusted under 35 U.S.C. 154(b) by 213 days.

(21) Appl. No.: 11/347,094

(22) Filed: Feb. 3, 2006

(65) Prior Publication Data

US 2007/0182187 A1    Aug. 9, 2007

(51) Int. Cl.
*B60R 27/00* (2006.01)
(52) U.S. Cl. .................. 296/24.34; 296/37.8; 296/37.14
(58) Field of Classification Search .............. 296/24.34, 296/37.8, 37.14
See application file for complete search history.

(56) References Cited

U.S. PATENT DOCUMENTS

| 7,004,527 | B2* | 2/2006 | Niwa et al. | 296/24.34 |
| 2005/0132768 | A1* | 6/2005 | Furuya | 70/422 |
| 2005/0146150 | A1* | 7/2005 | Niwa et al. | 296/24.34 |

* cited by examiner

*Primary Examiner*—Lori L Lyjak
(74) *Attorney, Agent, or Firm*—Gifford, Krass, Sprinkle, Anderson & Citowski, P.C.

(57) ABSTRACT

A center console for an automotive vehicle includes a storage bin having a hinged lid movable between open and closed positions. The lid has an inner surface facing the bin in the closed position. An outer surface extends from the storage bin. A pocket is recessed relative to the outer surface. The pocket is spaced apart from the storage bin. A cover is releasably attachable to the outer surface for covering the pocket. The cover is releasably attachable to the inner surface of the lid for storing the cover when it is not in use.

20 Claims, 5 Drawing Sheets

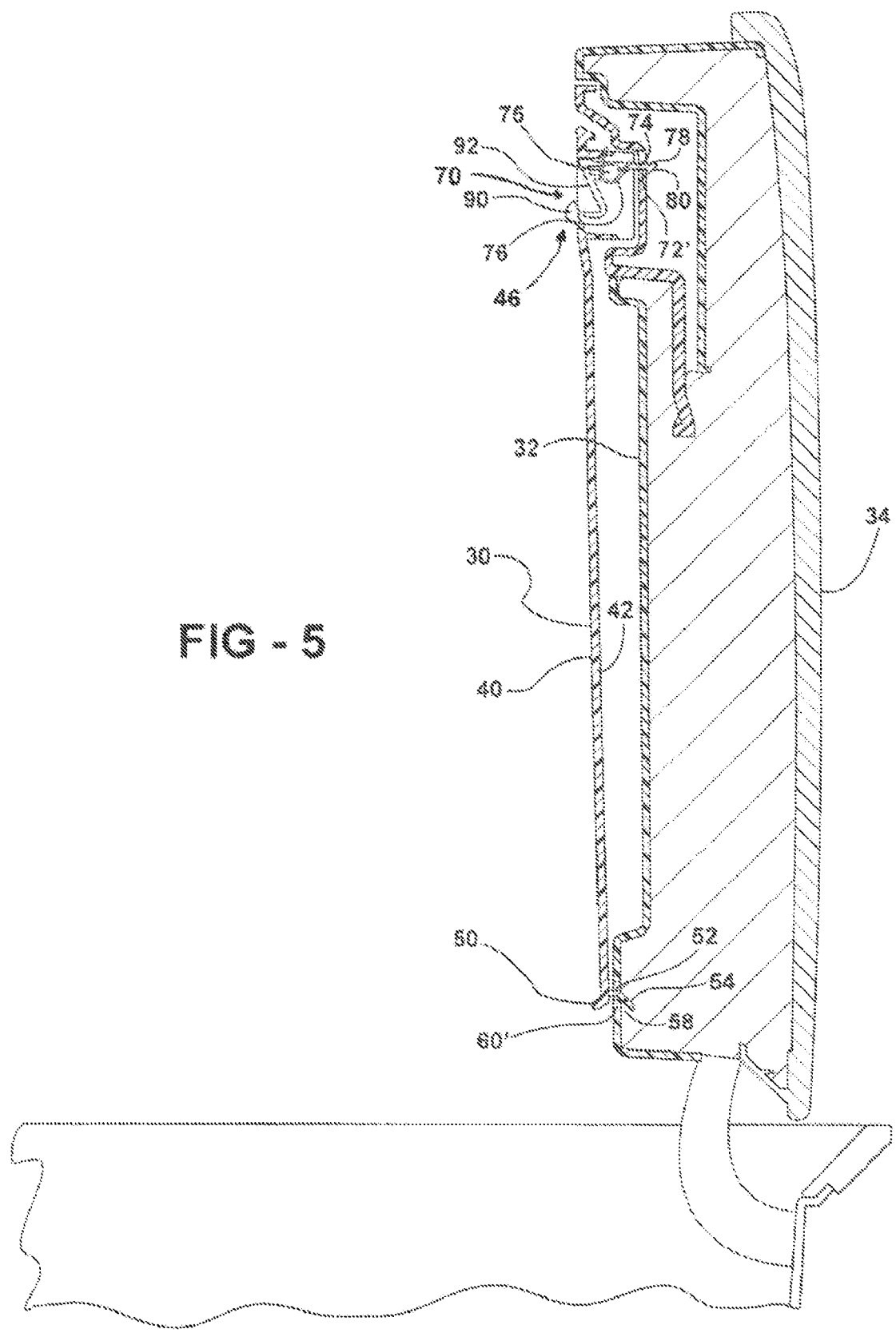

CENTER CONSOLE HAVING A STOWABLE MAP POCKET COVER

BACKGROUND OF THE INVENTION

1. Field of the Invention

The invention relates to center consoles for automotive vehicles. More particularly, the invention relates to a center console having a stowable map pocket cover.

2. Description of the Related Art

Automotive vehicles include center consoles disposed between the front driver and passenger seats. The center console typically includes holders for storing various items such as cups, pens, coins, maps, etc. Some center consoles include large bins that are covered by hinged lids that serve as armrests. But, conventional center console bins are typically box shaped and not well adapted for storing maps, files, books or other similar objects. Door pockets are typically used for storing maps and the like, but are not easily accessible due to the limited space between the seat and the door.

Therefore, it remains desirable to provide an improved center console design that has a pocket adapted for storing maps and other similarly dimensioned items.

SUMMARY OF THE INVENTION

According to one aspect of the invention, a center console is provided for use in an interior of an automotive vehicle. The center console includes a storage bin having a hinged lid movable between open and closed positions. The lid has an inner surface facing the bin in the closed position. An outer surface extends from the storage bin. A pocket is recessed relative to the outer surface. The pocket is spaced apart from the storage bin. A cover is releasably attachable to the outer surface for covering the pocket. The cover is releasably attachable to the inner surface of the lid for storing the cover when it is not in use.

According to another aspect of the invention, an automotive vehicle includes a center console and a cover. The center console is disposed between front seats in an interior portion of the vehicle. The center console has an outer wall. The center console has a pocket recessed relative to the outer wall. The cover is releasably attachable to a first position along the outer wall for covering said pocket. The cover is also releasably attachable to a second position spaced apart from the first position for storing the cover when it is not in use.

BRIEF DESCRIPTION OF THE DRAWINGS

Advantages of the present invention will be readily appreciated as the same becomes better understood by reference to the following detailed description when considered in connection with the accompanying drawings, wherein:

FIG. 5 is a cross sectional view taken on line 5—5 of FIG. 3.

DETAILED DESCRIPTION OF THE INVENTION

Figure 1:
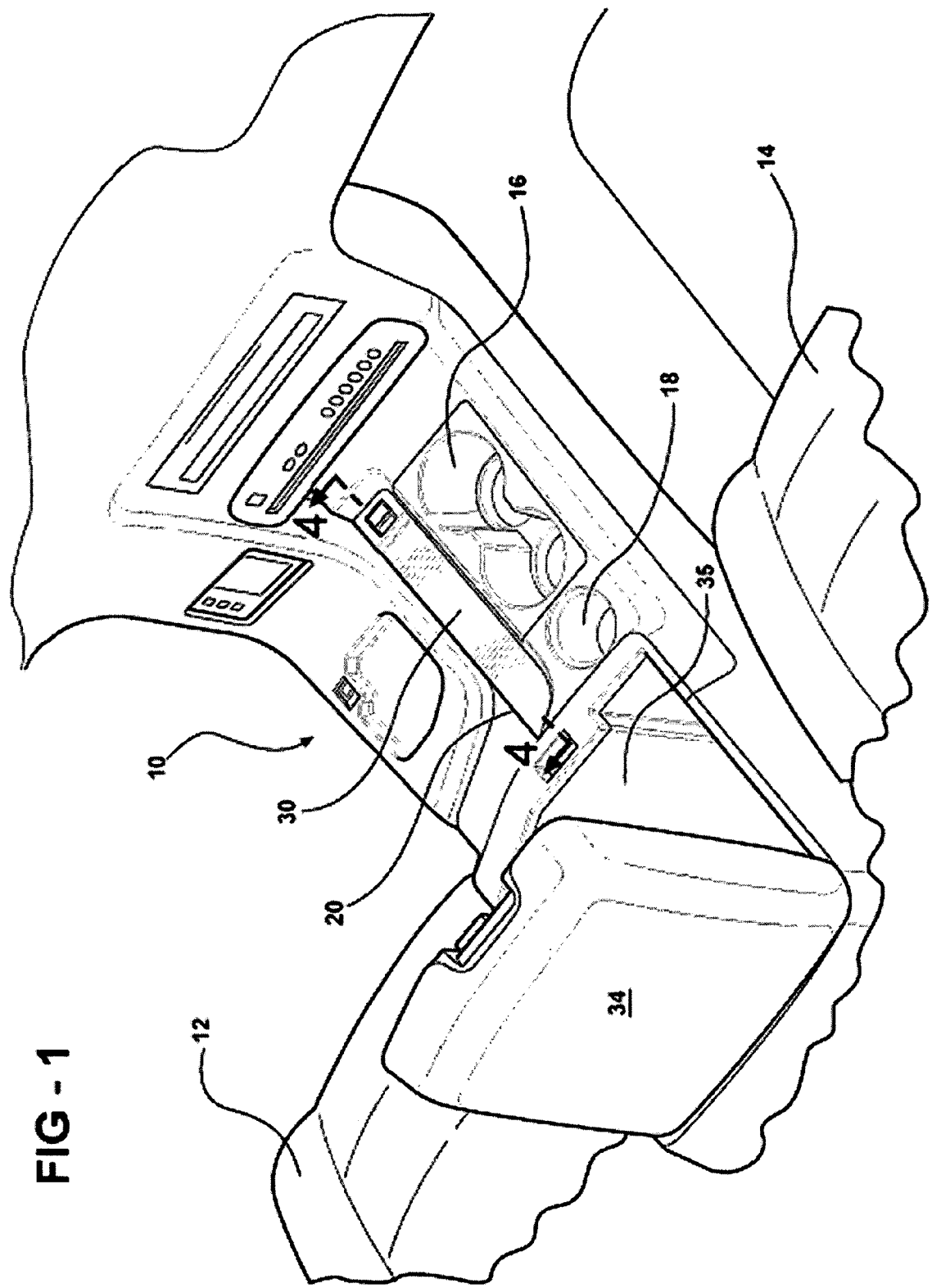
FIG. 1 is a top perspective view of a center console according to one embodiment of the invention, with the map pocket cover in the closed position.
Figure 2:
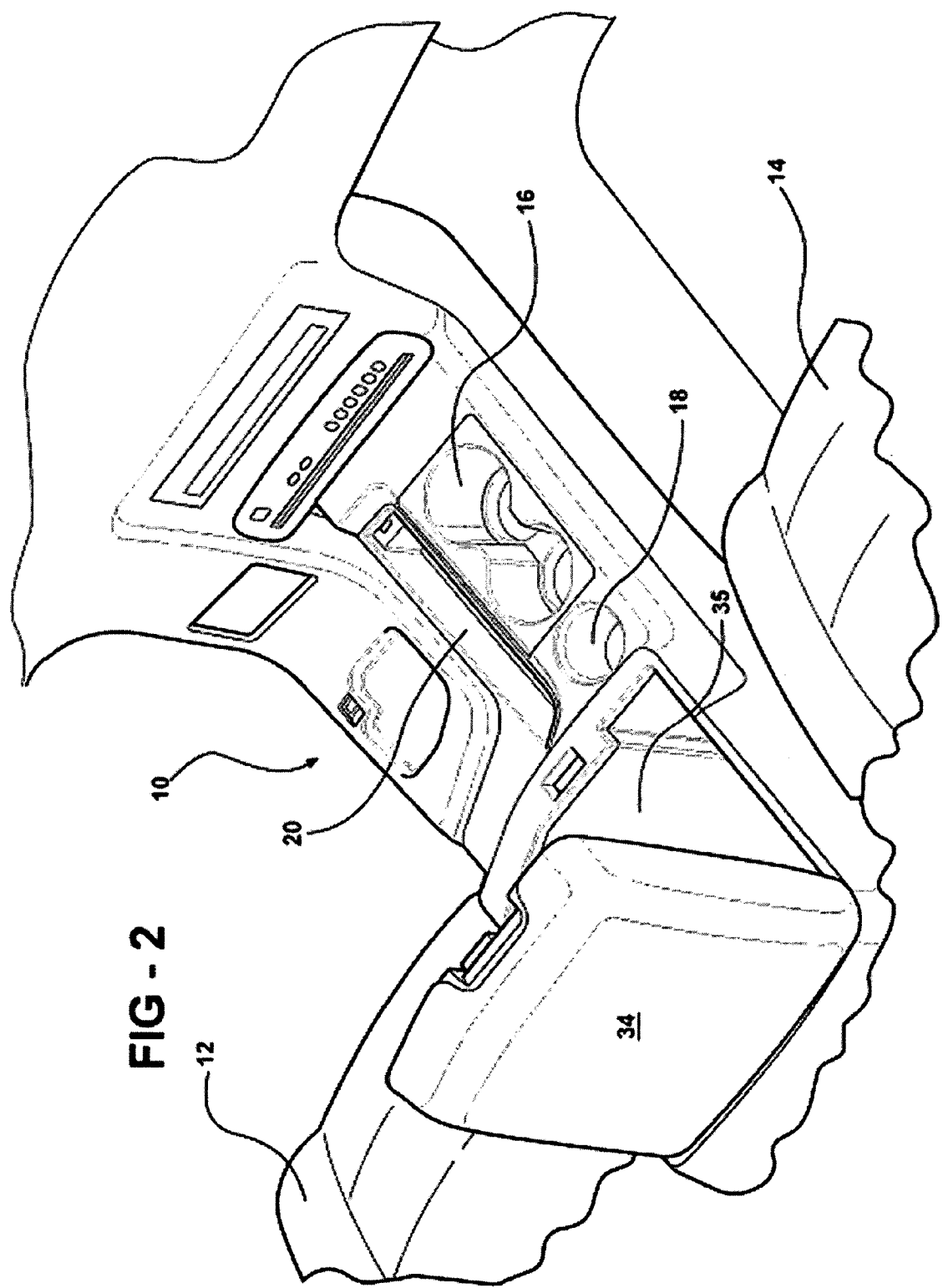
FIG. 2 is a top perspective view of the center console with the map pocket cover removed.
Figure 3:
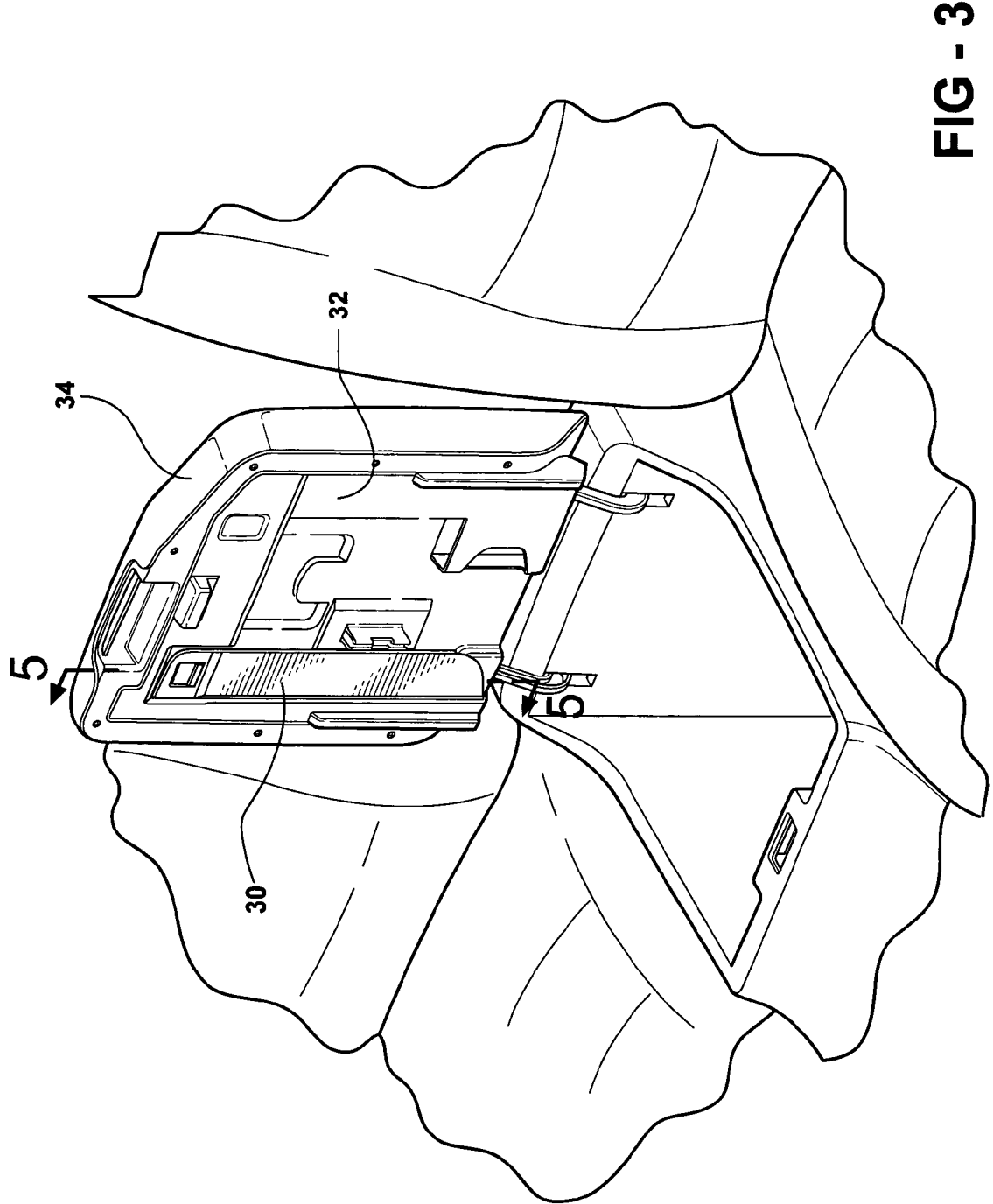
FIG. 3 is a rear perspective view of the center console with the map pocket cover in the stowed position.

Referring to FIGS. 1 and 2, a center console for an automotive vehicle is generally indicated at 10. The console 10 is disposed between front driver 12 and passenger 14 seats. The console 10 includes a storage bin 35 and an outer wall extending outwardly therefrom. The outer wall includes a cup holder 16 for supporting beverage containers and a recess 18 for holding miscellaneous small items, such as coins, paper clips, and a cup-type ashtray, etc. The outer wall also includes an elongated pocket 20 for storing maps or other similarly shaped items. A cover 30 is provided for concealing the pocket 20 (FIG. 1) and preventing debris and other objects from entering the pocket 20. The cover 30 includes a latch arrangement that releasably secured the cover 30 in position over the pocket 20. The cover 30 may be removed to facilitate frequent access to the pocket 20 or to accommodate objects that are taller than the depth of the pocket 20. Other locations in the vehicle may be adapted for engaging the latch arrangement to secure the cover 30 in the other locations when not in use. In one embodiment of the invention, the cover 30 is releasably securable to a lid 34 of the storage bin 35. The latch arrangement and its function are described in greater detail below.

Figure 4:
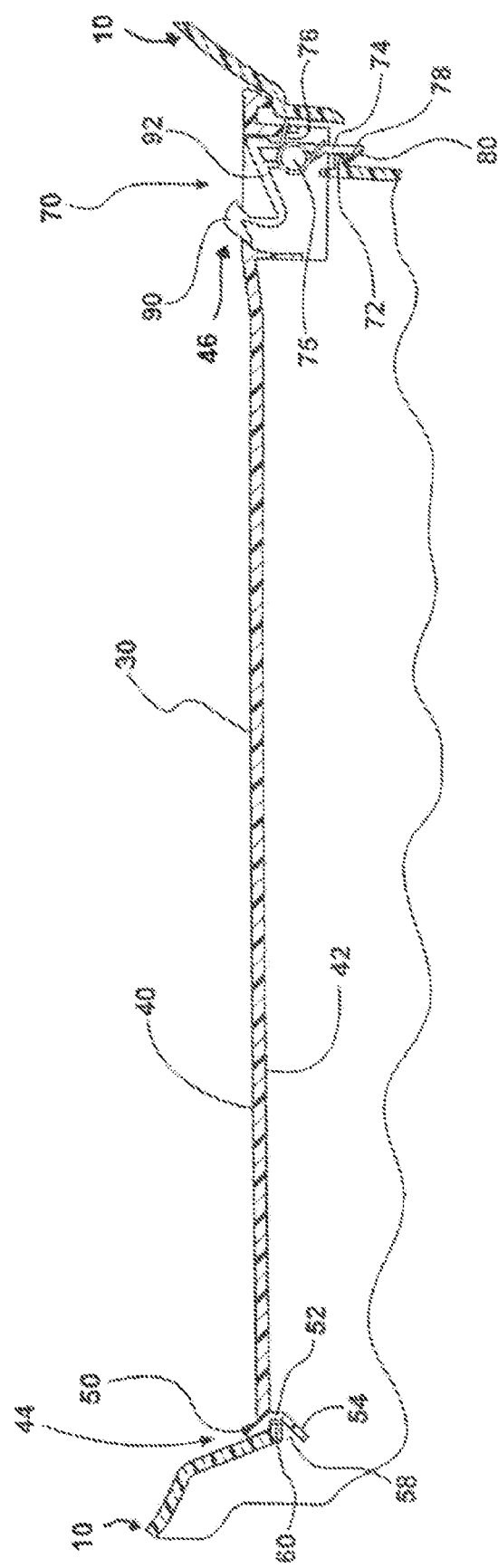
FIG. 4 is a cross sectional view of the center console with the map pocket in the stowed position.

In FIG. 4, the cover 30 is shown coupled by the latch arrangement to the console 10 for covering the pocket 20. More specifically, the cover 30 includes a top surface 40 and an opposite bottom surface 42 each extending between a locating end 44 and an opposite locking end 46. A lip 50 extends outwardly from the top surface 40 at the locating end 44 of the cover 30. A wall 52 extends outwardly from the bottom surface 42 at the locating end 44 of the cover 30. A flange 54 extends outwardly from a distal end of the wall 52. Both the lip 50 and the flange 54 extend at an angle relative to the wall 52. The lip 50 and flange 54 are spaced apart to form a recess 58 therebetween. The recess 58 is adapted to receive an edge 60 formed in the console 10 to locate the locating end 44 of the cover 30 relative to the pocket 20.

A latch mechanism 70 disposed on the locking end 46 of the cover 30. The latch mechanism 70 engages an outwardly extending tab 72 from the console 10 for locating and retaining the cover 30 in position over the pocket 20. More specifically, the latch mechanism 70 includes a pawl 74 having a proximal end 75 pivotally coupled to the locking end 46 of the cover 30 for movement between a locked position engaged with the tab 72 and an unlocked position disengaged from the tab 72. The distal end of the pawl 74 includes a hook portion 78 that engages the tab 72 in the locked position to retain the cover 30 relative to the console 10. The distal end of the pawl 74 also includes a cam surface 80 opposite the hook portion 78 that contacts the tab 72 during installation of the cover 30 to the console 10. The contact between the tab 72 and the cam surface 80 causes the pawl 74 to rotate toward the unlocked position. As the cover 30 is pushed into position, the cam surface 80 slides past the tab 72 and allows the pawl 74 to return to the locked position with the hook portion 78 engaged with the tab 72. A biasing member 76 continuously biases the pawl 74 toward the locked position. It should be readily appreciated that the latch mechanism may also utilize a sliding pawl rather than the pivoting pawl as described above for lockingly engaging the tab 72.

A button 90 is coupled to the proximal end 75 of the pawl 74 to allow one's finger to operate the pawl 74 between the locked and unlocked positions. The button 90 is coupled to the proximal end 75 of the pawl 74 by an arm 92 in a cantilevered manner to provide mechanical advantage when operating the pawl 74 against the force applied by the biasing member 76.

In use, the cover 30 is retained in position covering the pocket 20 when the recess 58 is engaged with the edge 60 of the console 10 and the hook portion 78 is engaged with the tab 72. To remove the cover 30, the pawl 74 is moved to the unlocked position by pressing downwardly on the button 90. The locking end 46 is then lifted away from the console 10. Once the hook portion 78 has cleared the tab 72, the entire cover 30 can be lifted away from the console 10, thereby allowing access to the pocket.

The cover 30 can then be stored along an inside surface 32 of the lid 34. A locking edge 60' and tab 72' are provided on the lid 34 for lockingly engaging the recess 58 and the hook portion 78 of the pawl 74, respectively. The engagement between the edge 60' and the tab 72' retains the cover 30 along the inner surface 32 of the lid 34. Thus, the cover 30 can be retained by the latch arrangement in either a use position concealing the pocket 20 in the console 10 or a stowed position hidden along the inside surface 32 of the lid 34.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

The invention claimed is:

1. A center console for use in an interior of an automotive vehicle, said center console comprising:
   a storage bin having a hinged lid movable between open and closed positions, said lid having an inner surface facing the bin in the closed position;
   an outer wall extending from said storage bin;
   a pocket recessed relative to said outer wall;
   a cover being releasably attachable to said outer wall for covering said pocket, said cover being releasably attachable to said inner surface of said lid for storing said cover when it is not in use.

2. A center console as set forth in claim 1, wherein the cover includes a latch arrangement reteasably coupling said cover to said outer wall for covering said pocket, said latch arrangement releasably coupling said cover to said inner surface of said lid for storing said cover when it is not in use.

3. A center console as set forth in claim 2, wherein said latch arrangement includes a recess formed on an end of said cover, said recess adapted to receive an edge of said outer wall for locating said cover relative to said pocket.

4. A center console as set forth in claim 3, wherein said latch arrangement includes a pawl lockingly engagable with said outer wall for locking said cover in a position covering said pocket.

5. A center console as set forth in claim 4, wherein said pawi is pivotally coupled to an end of said cover for movement in and out of locking engagement with an outwardly extending tab from said outer wall.

6. A center console as set forth in claim 5 including a biasing member continuously biasing said pawi toward a locked position for engagement with said tab.

7. A center console as set forth in claim 6 wherein said pawl includes a cam surface for moving said pawl out of said locked position as said cover is placed into position covering said pocket.

8. A center console as set forth in claim 6 wherein said pawi includes a button to facilitate manual actuation of said pawi between locked and unlocked positions.

9. A center console as set forth in claim 4, wherein said recess and said pawl of said cover are engagable with an edge and a tab on said lid, respectively, for retaining said cover in a storage position along said inner surface of said lid.

10. An automotive vehicle comprising:
    a center console disposed between front seats in an interior portion of said vehicle, said center console having an outer wall, said center console having a pocket recessed relative to said outer wail;
    a cover being releasably attachable to a first position along said outer wall for covering said pocket, said cover being releasably attachable to a second position spaced apart from said first position for storing said cover when it is not in use; and
    a storage bin having a hinged lid movable between open and closed positions, said lid having an inner surface facing the bin in the closed position;
    said cover releasably is attachable to said inner surface of said lid for storing said cover when it is not in use.

11. An automotive vehicle as set forth in claim 10, wherein the cover includes a latch arrangement for retaining said cover in one of said first and second positions.

12. An automotive vehicle as set forth in claim 11 wherein said latch arrangement includes a recess formed on an end of said cover and adapted for locating said cover in one of said first and second positions.

13. An automotive vehicle as set forth in claim 12, wherein said latch arrangement includes a pawl for locking said cover in one of said first and second positions.

14. An automotive vehicle as set forth in claim 12, wherein said paw!is pivotally coupled to an end of said cover for movement between locked and unlocked positions.

15. An automotive vehicle as set forth in claim 13 including a biasing member continuously biasing said pawl toward said locked position.

16. An automotive vehicle as set forth in claim 14 wherein said second position is an inner surface of a hinged storage bin lid.

17. A center console for use in an interior of an automotive vehicle, said center console comprising:
    a storage bin having a hinged lid movable between open and closed positions, said lid having an inner surface facing the bin in the closed position;
    an outer wall extending from said storage bin;
    a pocket recessed relative to said outer wail;
    a latch arrangement releasably coupling a cover to said outer wall for covering said pocket, said latch arrangement releasably coupling said cover to said inner surface of said lid for storing said cover when it is not in use.

18. A center console as set forth in claim 17, wherein said latch arrangement includes a recess formed on an end of said cover, said recess adapted to receive an edge of said outer wail for locating said cover relative to said pocket.

19. A center console as set forth in claim 18, wherein said latch arrangement includes a pawi lockingly engagable with said outer wall for locking said cover in a position covering said pocket.

20. A center console as set forth in claim 19, wherein said pawi is pivotally coupled to an end of said cover for movement in and out of locking engagement with an outwardly extending tab from said outer wall.

* * * * *

UNITED STATES PATENT AND TRADEMARK OFFICE
CERTIFICATE OF CORRECTION

PATENT NO. : 7,422,260 B2 Page 1 of 1
APPLICATION NO. : 11/347094
DATED : September 9, 2008
INVENTOR(S) : Charan Singh Lota It is certified that error appears in the above-identified patent and that said Letters Patent is hereby corrected as shown below:

Column 3, line 39, replace "releas ably" with --releasably--

Column 3, line 43, replace "reteasably" with --releasably--

Column 3, line 56, replace "pawi" with --pawl--

Column 3, line 60, replace "pawi" with --pawl--

Column 4, line 1, replace "pawi" with --pawl--

Column 4, line 2, replace "pawi" with --pawl--

Column 4, line 12, replace "wail" with --wall--

Column 4, line 34, replace "paw!is" with --pawl is--

Column 4, line 48, replace "wail" with --wall--

Column 4, line 58, replace "pawi" with --pawl--

Column 4, line 62, replace "pawi" with --pawl--

Signed and Sealed this

Fourth Day of November, 2008

JON W. DUDAS
*Director of the United States Patent and Trademark Office*